(12) United States Patent
Luo

(10) Patent No.: US 8,295,337 B2
(45) Date of Patent: Oct. 23, 2012

(54) DIGITAL DIAGNOSTICS PARAMETER STORAGE

(75) Inventor: Jun Luo, Singapore (SG)

(73) Assignee: Finisar Corporation, Sunnyvale, CA (US)

( * ) Notice: Subject to any disclaimer, the term of this patent is extended or adjusted under 35 U.S.C. 154(b) by 1158 days.

(21) Appl. No.: 12/031,360

(22) Filed: Feb. 14, 2008

(65) Prior Publication Data

US 2009/0168858 A1  Jul. 2, 2009

(30) Foreign Application Priority Data

Dec. 27, 2007  (SG) ................. 200719055-6

(51) Int. Cl.
*H04B 17/00* (2006.01)
(52) U.S. Cl. ........................................ 375/224
(58) Field of Classification Search ............ 375/224, 375/228; 370/241, 252; 379/1.01; 455/423
See application file for complete search history.

(56) References Cited

U.S. PATENT DOCUMENTS

| 2006/0063520 | A1* | 3/2006 | Fratti et al. ............... 455/423 |
| 2007/0248360 | A1* | 10/2007 | Woolf et al. ............ 398/135 |
| 2009/0028574 | A1* | 1/2009 | Dybsetter et al. ....... 398/135 |
| 2009/0156200 | A1* | 6/2009 | Ishii ....................... 455/425 |

* cited by examiner

*Primary Examiner* — Khanh C Tran

(74) *Attorney, Agent, or Firm* — Maschoff Gilmore & Israelsen

(57) ABSTRACT

A method of managing storage of digital diagnostics parameters on a transceiver device may include loading persistent digital diagnostics parameters from a persistent memory into a system memory and resetting non-persistent digital diagnostics parameters, receiving updates to the non-persistent digital diagnostics parameters in the system memory, and writing the updates to the non-persistent digital diagnostic parameters in the system memory to the persistent memory.

19 Claims, 3 Drawing Sheets

DIGITAL DIAGNOSTICS PARAMETER STORAGE

CROSS-REFERENCE TO RELATED APPLICATIONS

This application claims priority to Singapore patent application serial number 200719055-6 filed Dec. 27, 2007, which is incorporated herein by reference in its entirety.

BACKGROUND OF THE INVENTION

1. The Field of the Invention

The present invention relates generally to optical transmitters and receivers. More specifically, the present invention relates to optical transmitter and receivers that are capable of maintaining updated digital diagnostic parameters in persistent memory using microcode while avoiding interruptions to transceiver digital diagnostic communications and internal controls.

2. Background and Relevant Art

Computing and networking technology have transformed our world. As the amount of information communicated over networks has increased, high speed transmission has become ever more critical. Many high speed data transmission networks rely on optical transceivers and similar devices for facilitating transmission and reception of digital data embodied in the form of optical signals over optical fibers. Optical networks are thus found in a wide variety of high speed applications ranging from as modest as a small Local Area Network (LAN) to as grandiose as the backbone of the Internet.

Typically, data transmission in such networks is implemented by way of an optical transmitter (also referred to as an electro-optic transducer), such as a laser or Light Emitting Diode (LED). The electro-optic transducer emits light when current is passed through it, the intensity of the emitted light being a function of the current magnitude. Data reception is generally implemented by way of an optical receiver (also referred to as an optoelectronic transducer), an example of which is a photodiode. The optoelectronic transducer receives light and generates a current, the magnitude of the generated current being a function of the intensity of the received light.

Various other components are also employed by the optical transceiver to aid in the control of the optical transmit and receive components, as well as the processing of various data and other signals. For example, such optical transceivers typically include a driver (e.g., referred to as a "laser driver" when used to drive a laser) configured to control the operation of the optical transmitter in response to various control inputs. The optical transceiver also generally includes an amplifier (e.g., often referred to as a "post-amplifier") configured to amplify the channel-attenuated received signal prior to further processing. A controller circuit (hereinafter referred to as the "controller") controls the operation of the laser driver and post-amplifier.

Often, a host or other external device makes use of digital diagnostics in controlling the operation of the laser drive, post amplifier, or other components. For example, digital diagnostics may be used to monitor various parameters which may affect the operation of the transceiver. Often times the parameters are stored on persistent memory within the transceiver. A host would then access the parameters for further processing, which often included determining settings for the laser driver, post amplifier or other components to help ensure proper operation of the transceiver considering the conditions indicated by the parameters.

Previously, while the host updated the parameters on persistent memory, further access to the persistent memory was stalled during the update time. In particular, if updated parameters were available, the controller circuit would have to wait until the host was finished storing the parameters on the persistent memory. Other software logic or processes would also be stalled from accessing the persistent memory.

BRIEF SUMMARY OF THE INVENTION

The foregoing problems with the prior state of the art are overcome by the principles of the present invention, which relate to an optical transceiver (or optical transmitter or optical receiver) that has at least one processor, system memory, and persistent memory.

A method of managing storage of digital diagnostics parameters on a transceiver device may include loading persistent digital diagnostics parameters from the persistent memory into the system memory and resetting non-persistent digital diagnostics parameters, receiving updates to the non-persistent digital diagnostics parameters in the system memory, and writing the updates to the non-persistent digital diagnostic parameters in the system memory to the persistent memory.

Additional features and advantages of the invention will be set forth in the description that follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the example briefly described above will be rendered by reference to specific examples thereof which are illustrated in the appended drawings. Understanding that these drawings depict only typical examples and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1:
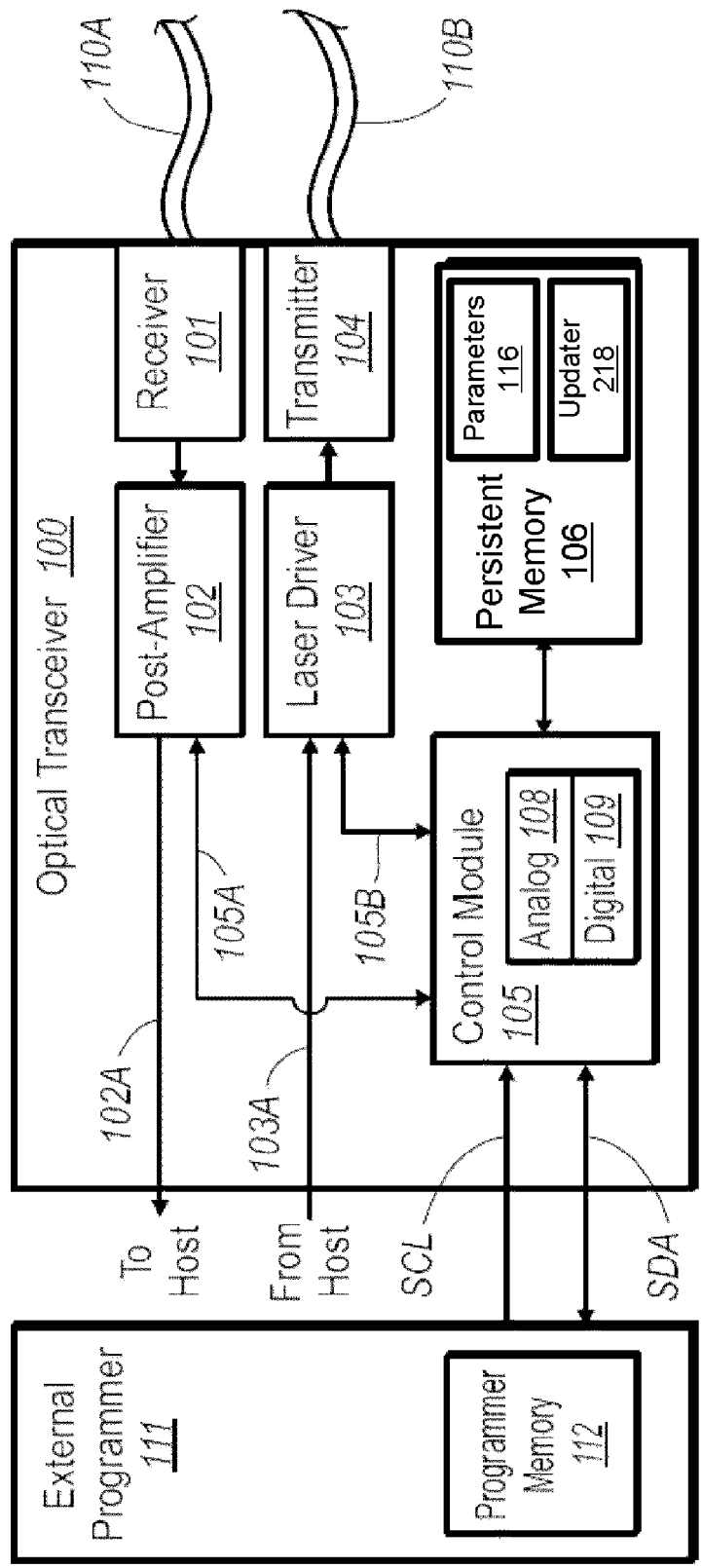
FIG. 1 schematically illustrates an example of an optical transceiver that may implement methods for storing digital diagnostics parameters.

Devices, systems, and methods are provided herein for managing the storage of digital diagnostic parameters within a transceiver device. The devices, systems and methods disclosed herein may operate while minimizing or eliminating the interruption of transceiver communications and controls.

In at least one example, digital diagnostic parameters are stored that relate to one or more multi-source agreement (MSA). These digital diagnostic parameters may relate to a number of factors, such as conditions that may affect the operation of the transceiver. These digital diagnostic parameters may be determined by analyzing signals received from various sensors or other sources, including analog component sources and sensors. These parameters fall into two categories: persistent and non-persistent. A persistent parameter need remember its previous value and must restore to its previous value upon power on or reset. In contrast, a non-persistent parameter need discard its last session value and be reset to an initial value upon power on and/or reset. Regardless of persistence, relevant software or firmware stores these parameters in system memory, such as a RAM buffer, on the transceiver. Once the digital diagnostics parameters are in system memory, the host and/or other control logic may readily access the digital diagnostic parameters. An updater compares the persistent digital diagnostics parameters stored in system memory to their second copy stored in persistent memory. Upon detection of any changes, the updater then writes the appropriate updates to the persistent memory. Such a configuration eliminates stalls associated with directly accessing the digital diagnostic parameters on the persistent memory to thereby allow digital diagnostics parameters and other information to be readily written to and read from the transceiver.

Herein, the persistent digital diagnostics parameters stored in system memory are referred as buffered copies while these persistent parameters stored in persistent memory are called mirrored copies.

The updater module can be designed to take only a few instruction cycles for each synchronization operation due, at least in part, to the parallelism of CPU and peripherals. Once a write is started, it can proceed to do other tasks. Completion of a write operation can be signaled by an interrupt that is typically available on many micro-controllers or by a simple polling at idle time when high-priority tasks have been completed. Such a process usually takes only a few instructions. The updater may also be configured to postpone write to persistent memory until enough changes are collected in system memory. Such a configuration may limit the number of writes to the persistent memory and thereby improve the life of the persistent memory. This is especially effective if the persistent memory has to be erased and/or written page by page, or certain parameters may be updated iteratively. Further the methods, systems and devices described below do not conflict with other modular software techniques. When combined with a priority-based task scheduler, such a configuration may yield improved performance with whatever hardware resources are available. An example operational optical transceiver environment will first be described. Then, a method of managing digital diagnostics parameter storage will be described with respect to the operational environment.

FIG. 1 illustrates an optical transceiver 100 according to one example. While the optical transceiver 100 will be described in some detail, the optical transceiver 100 is described by way of illustration only, and not by way of limitation. The principles disclosed herein may be suitable for 1G, 2G, 4G, 10G and higher bandwidth fiber optic links. Furthermore, the principles of the present invention may be implemented in optical (e.g., laser) transmitter/receivers of any form factor such as XFP, SFP and SFF, without restriction. Further, the principles described herein are not limited to an optical transceiver environment at all.

The optical transceiver 100 receives an optical signal from fiber 110A using receiver 101. The receiver 101 acts as an opto-electric transducer by transforming the optical signal into an electrical signal. The receiver 101 provides the resulting electrical signal to a post-amplifier 102. The post-amplifier 102 amplifies the signal and provides the amplified signal to an external host as represented by arrow 102A. The external host may be any computing system capable of communicating with the optical transceiver 100. In at least one example, the optical transceiver 100 may be a printed circuit board or other components/chips within the host, although this is not required.

The optical transceiver 100 may also receive electrical signals from the host for transmission onto the fiber 110B. Specifically, the laser driver 103 receives the electrical signal as represented by the arrow 103A, and drives the transmitter 104 (e.g., a laser or Light Emitting Diode (LED)) with signals that cause the transmitter 104 to emit onto the fiber 110B optical signals representative of the information in the electrical signal provided by the host. Accordingly, the transmitter 104 serves as an electro-optic transducer.

The behavior of the receiver 101, the post-amplifier 102, the laser driver 103, and the transmitter 104 may vary dynamically due to a number of factors. For example, temperature changes, power fluctuations, and feedback conditions may each affect the performance of these components. Accordingly, the optical transceiver 100 includes a control module 105, which may perform digital diagnostics and other processes to evaluate temperature and voltage conditions and other operational circumstances, and receive information from the post-amplifier 102 (as represented by arrow 105A) and from the laser driver 103 (as represented by arrow 105B). This may allow the control module 105 to optimize the dynamically varying performance, and additionally detect when there is a loss of signal.

Specifically, the control module 105 may counteract these changes by adjusting settings on the post-amplifier 102 and/or the laser driver 103 as also represented by the arrows 105A and 105B. These settings adjustments are quite intermittent since they are only made when temperature or voltage or other low frequency changes so warrant. With continuing reference to FIG. 1, the control module 105 may have access to the persistent memory 106, which in one embodiment is an Electrically Erasable and Programmable Read Only Memory (EEPROM). Persistent memory 106 may also be any other non-volatile memory source.

Data and clock signals may be provided from the host to the control module 105 using a serial clock line SCL, and a serial data line SDA. Also data may be provided from the control module 105 to the host using serial data line SDA to allow for digital diagnostics and readings of temperature levels, transmit/receiver power levels, and the like.

The control module 105 includes both an analog portion 108 and a digital portion 109. Together, they allow the control module to implement logic digitally, while still largely interfacing with the rest of the optical transceiver 100 using analog signals. The settings and/or conditions associated with the signals may be stored in persistent memory 106, as will be described in more detail below. In at least one example, this information includes parameters 116 associated with digital diagnostics processes, measurements and/or settings. Accordingly, parameters 116 are illustrated as stored on the persistent memory 106. By way of introduction, in at least one example a buffered copy of the parameters may be stored in a volatile memory portion (not shown) of the control module 105, such as a system memory portion of the control module 105. The host, the analog portion 108, or other control logic or software may then access the buffered copy of the parameters rather than having to access the persistent memory 106. Such a configuration may reduce or eliminate stalls associated with accessing the parameters on the persistent memory 106 and the resulting slow down.

As shown in FIG. 1, transceiver 100 may be communicatively coupled to an external programmer 111. External programmer 111 may be a transceiver host computing system or it may be some other computing system cable of providing new microcode to the optical transceiver 100. External programmer 111 may include a programmer memory 112, which may store a library of microcode structured such that, when executed by the transceiver processors, the microcode controls behavior of the transceiver 100. A keyboard or a mouse may be connected to external programmer 111 through use of a serial or parallel port to facilitate user control of external programmer 111 operational functions. External programmer 111 may also be equipped with a computer monitor or other display device.

The user may access transceiver 100 through use of external programmer 111. External programmer 111 may communicate with control module 105 using an interface protocol such as I²C, shown in FIG. 1 by the SDA and SCL lines. Other interface protocols may also be used to for communication between external programmer 111 and control module 105. This communication may include reading and/or writing information related to the parameters 216 and/or the parameters 116.

Figure 2:
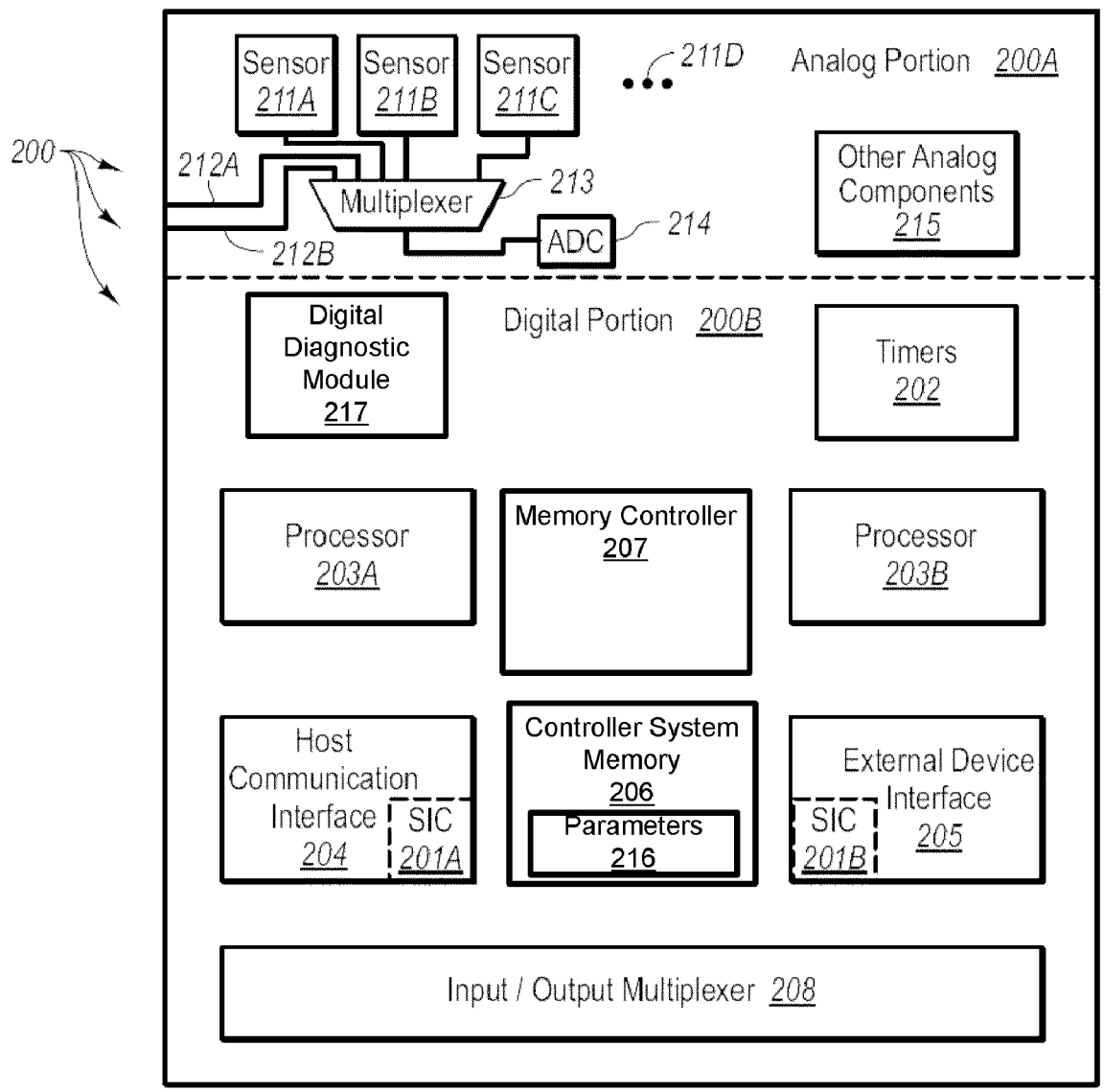
FIG. 2 schematically illustrates an example of the control module of FIG. 1.

FIG. 2 schematically illustrates an example 200 of the control module 105 in further detail. The control module 200 includes an analog portion 200A that represents an example of the analog portion 108 of FIG. 1, and a digital portion 200B that represents an example of the digital portion 109 of FIG. 1.

For example, the analog portion 200A may contain digital to analog converters, analog to digital converters, high speed comparators (e.g., for event detection), voltage based reset generators, voltage regulators, voltage references, clock generator, and other analog components. Further, the analog portion 200A includes sensors 211A, 211B, 211C amongst potentially others as represented by the horizontal ellipses 211D. Each of these sensors may be responsible for measuring operational parameters that may be measured from the control module 200 such as, for example, supply voltage and transceiver temperature. The control module 200 may also receive external analog or digital signals from other components within the optical transceiver that indicate other measured parameters such as, for example, laser bias current, transmit power, receive power, laser wavelength, laser temperature, and Thermo Electric Cooler (TEC) current. Two external lines 212A and 212B are illustrated for receiving such external analog signals although there may be many of such lines.

The internal sensors may generate analog signals that represent the measured values. In addition, the externally provided signals may also be analog signals. In this case, the analog signals are converted to digital signals so as to be available to the digital portion 200B of the control module 200 for further processing. This processing may specifically include performing digital diagnostics on the digital signals. Of course, each analog parameter value may have its own Analog to Digital Converter (ADC). However, to preserve chip space, each signal may be periodically sampled in a round robin fashion using a single ADC such as the illustrated ADC 214. In at least the example illustrated, each analog value may be provided to a multiplexer 213, which selects in a round robin fashion, one of the analog signals at a time for sampling by the ADC 214. Alternatively, multiplexer 213 may be programmed to allow any order of analog signals to be sampled by ADC 214.

As previously mentioned, the analog portion 200A of the control module 200 may also include other analog components 215 such as, for example, digital to analog converters, other analog to digital converters, high speed comparators (e.g., for event detection), voltage based reset generators, voltage regulators, voltage references, clock generator, and other analog components.

The digital portion 200B of the control module 105 may also include a digital diagnostics module 217. The digital diagnostics module 217 is configured to perform digital diagnostics functions on the signals received from the analog portion 200A. Such digital diagnostics functions may include, for example, providing (potentially real-time) diagnostic information about a transceiver's operating conditions (power, current, voltage, wavelength and temperature monitoring), generating diagnostic data by digitizing analog transceiver signals, internally or externally calibrating a transceiver, issuing alarms and warnings (e.g., based on specified power, current, voltage, wavelength and temperature thresholds), retrieving vendor information, and querying a transceiver for supported features (encoding, bit rate, etc).

In addition to performing digital diagnostics on signals from the analog portion 200A, the digital diagnostics module 217 is configured to store parameters associated with one or more multi-source agreement (MSA). Such parameters may include, but are not limited to, transmitter bias current, transmitter optical power, receiver optical power, transceiver supply voltage, transceiver temperature and/or other parameters that may or may not be part of a MSA.

The host may access the parameters via the digital diagnostics module 217. These buffered parameters are stored on controller system memory 206 and their mirrored copies are stored the persistent memory 106. In at least one example, the parameters 216 stored on the controller system memory 206 are introduced as a buffered copy of the parameters 116 stored on persistent memory 106 illustrated in FIG. 1. Further, the digital diagnostic parameters 216 may be initialized upon power cycle or reset by copying from the persistent memory 106.

Regardless of how the parameters 216 are loaded into controller system memory 206, an updater software module 218 may be configured to compare the parameters 116 in persistent storage with the parameters 216 in controller system memory 206. The updater software module 218 may be stored on the persistent memory 106 (FIG. 1) If a change is detected, the updater module 218 may cause the changed parameters 216 to be written to persistent memory 106. The updater module 218 may run in the background or as a low-priority software task. Because of the random access nature of memory 206, the parameters 216 are always available to the host or other control software logic. Accordingly, a host, other control software logic, or other components or software may readily and rapidly access the latest parameters 216.

One example will now be discussed in more detail with continuing reference to FIG. 2. The digital portion 200B of the control module 200 may include a timer module 202 that provides various timing signals used by the digital portion 200B. Such timing signals may include, for example, programmable processor clock signals. The timer module 202 may also act as a watchdog timer.

Two general-purpose processors 203A and 203B may also be included. The processors recognize instructions that follow a particular instruction set and may perform normal general-purpose operation such as shifting, branching, adding, subtracting, multiplying, dividing, Boolean operations, comparison operations, and the like. In one embodiment, the general-purpose processors 203A and 203B are each a 16-bit processor and may be identically structured. The precise structure of the instruction set is not important to the principles of the present invention as the instruction set may be optimized around a particular hardware environment, and as the precise hardware environment is not important to the principles of the present invention.

A host communications interface 204 is used to communicate with the host. The external device interface 205 is used to communicate with, for example, other modules within the optical transceiver 100 such as, for example, the post-amplifier 102, the laser driver 103, or the persistent memory 106.

The internal controller system memory 206 (not to be confused with the external persistent memory 106) includes Random Access Memory (RAM) or other readily accessed memory. The memory controller 207 shares access to the controller system memory 206 amongst each of the processors 203A and 203B and with the host communication interface 204 and the external device interface 205. In particular, in one example the memory controller 207 directs components, such as the analog portion 200A, the host, or other components or software logic that are seeking to access digital diagnostics parameters to access the digital diagnostics parameters 216 stored on the controller system memory 206.

In one embodiment, the host communication interface 204 includes a serial interface controller 201A, and the external device interface 205 includes a serial interface controller 201B. The two serial interface controllers 201A and 201B may communicate using a two-wire interface such as $I^2C$ or may be another interface so long as the interface is recognized by both communicating modules. One serial interface controller (e.g., serial interface controller 201B) is a master component, while the other serial interface controller (e.g., serial interface controller 201A) is a slave component.

An input/output multiplexer 208 multiplexes the various input/output pins of the control module 200 to the various components within the control module 200. This may enable different components to dynamically assign pins in accordance with the then-existing operational circumstances of the control module 200. Accordingly, there may be more input/output nodes within the control module 200 than there are pins available on the control module 200, thereby reducing the footprint of the control module 200.

In at least one example, a portion of the persistent memory stores microcode, such as boot loader microcode and parameter updater microcode. The boot loader code, when executed by a processor, causes the processor to implement a transceiver boot loader that functionally controls the firmware upgrading process. Specifically, the processor causes the transceiver 100 or components thereof to perform functions that will be hereinafter attributed to the boot loader. Microcode shall be broadly understood to mean any type of operational or control code, such as, but not limited to, firmware and software, that runs on a microprocessor and controls the operation of the transceiver when executed. Further, in at least one example, operation of the parameter updater 218 microcode may cause the parameters 116 stored in persistent memory 106 to be loaded into system memory 206 during initialization of the parameters 216.

Having described a specific environment with respect to FIGS. 1 and 2, it will be understood that this specific environment is only one of countless architectures in which the principles of the present invention may be employed. As previously stated, the principles of the present invention are not intended to be limited to any particular environment. For instance, the processors, memory, and other components illustrated within FIGS. 1 and 2 may be implemented as a Field Programmable Gate Array (FPGA).

Figure 3:
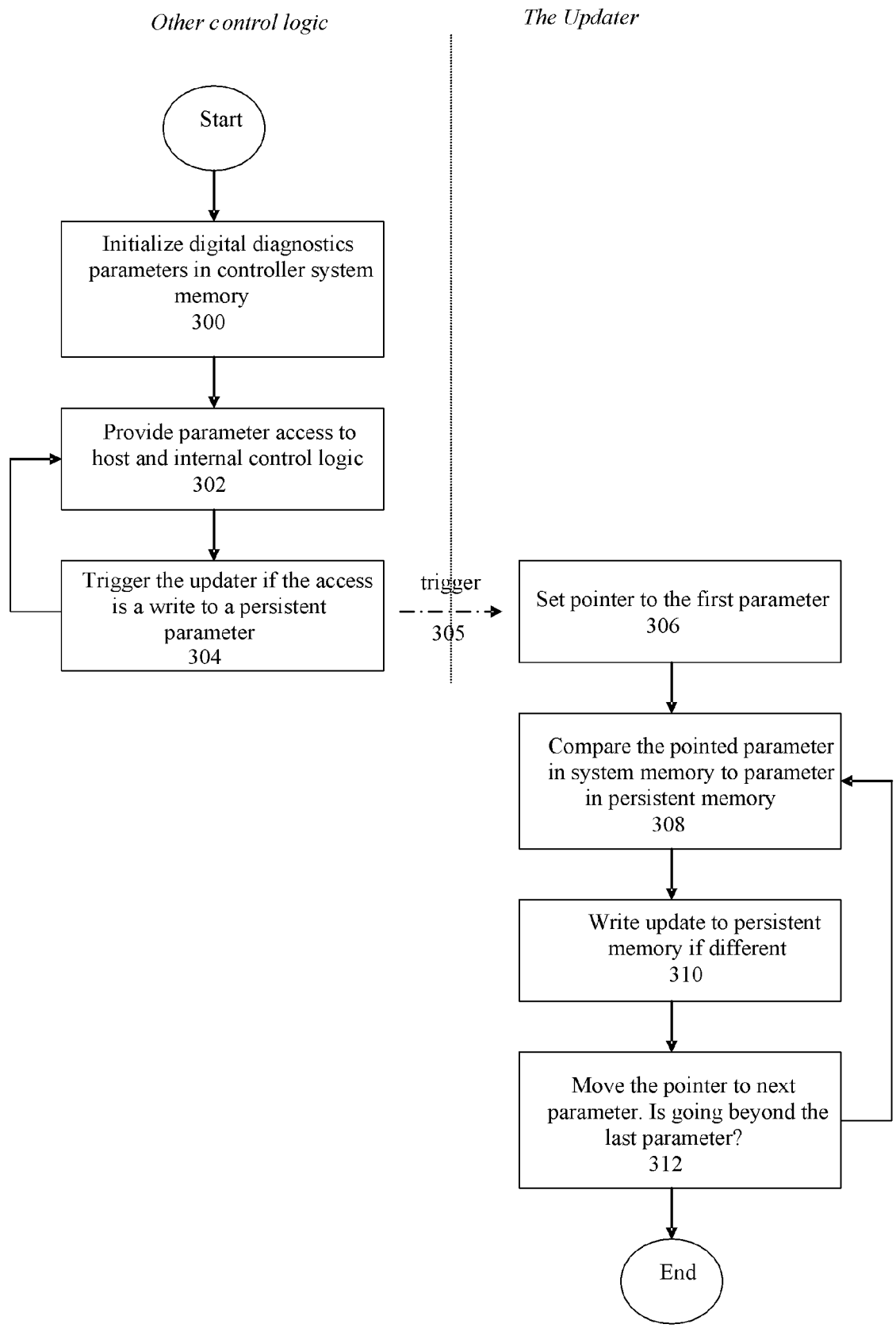
FIG. 3 illustrates a flowchart of a method for managing the storage of digital diagnostics parameters according to one example.

Accordingly, the control module 105 may store changes to device parameters on controller system memory 206 as well as on the persistent memory 106. FIG. 3 is a flowchart of an example of a method of managing the storage of digital diagnostic parameters. The method begins at step 300 when the optical transceiver 100 is powered up or reset and the digital diagnostics parameters are initialized in controller system memory. On the one hand, the updater 218 copies all mirrored parameters 116 to buffered parameters 216. This implements the persistence functions as required either by MSA as a contract with host or by internal design logic. On the other hand, the non-persistent set of parameters 216 will be assigned to initial values as required similarly by MSA or internal logic. These initial values may simply be but not limited to zeros.

Regardless of how the digital diagnostic parameters are initialized, in at least one example the digital diagnostic parameters are stored within controller system memory, other volatile memory, and/or other readily accessible memory. Once initialization of parameters 216 in RAM has been done, access to these parameters is available immediately as illustrated by step 302 to the host as well as other internal control logic on the controller system memory. Unlike 106 which is inaccessible during a write operation, the buffered RAM parameters 216 are always available. For example, a memory controller 207 or other logic receives requests to access digital diagnostic parameters and fulfills the requests using the parameters 216 on the controller system memory 206. These requests include read and/or write requests from the analog portion, the host, other components, and/or other software logic.

Other software control logic may relate to the post-amplifier 102, the laser driver 103 or other components. For example, settings for the post-amplifier 102 and the laser driver 103 may be related to the digital diagnostic parameters stored in the controller system memory 206. Changes to these settings and/or other settings may be made by accessing the parameters. Any of the devices, components, and/or software logic may access the digital diagnostic parameters on the controller system memory. In particular, in at least one example when an external device and/or control logic seeks to access the digital diagnostic parameters, a memory controller 207 of the control module 105 directs the accessing device and/or control logic to access the digital diagnostics parameters 216 on the controller system memory 206.

The size of the memory associated with the digital diagnostic parameters may be selected as desired. This selection may then be allocated on persistent memory for later use. Such a configuration may allow the present method to be adapted to a wide variety of controller modules that may include any number of configurations.

If an access to the digital diagnostics parameters 216 is a write access to persistent digital diagnostics parameters as determined at step 304, the updater 218 will be triggered to start as illustrated at step 305. The trigger may occur immediately after such a write or be postponed until a proper number of writes have been collected if compatible to MSA or internal design logic. In addition, such a trigger may also be made by an explicit request of saving changes by host as defined by specific application cases. In other examples, a full comparison and update may be made just before the control module is powered off. In this case, writes to persistent memory are minimized to the least and life time of the persistent memory is improved.

At step 306, the updater 218 is started to scan persistent parameters stored in 216 and 116. The updater will compare the buffered copy of each persistent parameter in 216 with its mirrored copy in 116 at step 308. Upon detection of a mismatch at step 310, the one in persistent memory will be written with the content of its buffered copy in RAM. This will have the persistent parameter updated with latest value. Once the updater has compared and made possible write to one parameter pair, it will continue with the next parameter pair at step 312. Upon all persistent parameters have been compared and possibly updated, the updater 218 will stop this scan session.

There is a condition that the updater 218 has been started and is scanning parameters when another trigger occurs due to a write to 216 as illustrated by 305. In this case, the updater must be designed to scan the newly-changed parameter. One possible method to handle this requirement is simply to reset the pointer of the updater 218 to its starting point, i.e. the first parameter, as illustrated by step 306.

Accordingly, devices systems, and methods have been discussed for managing the storage of digital diagnostic parameters within a transceiver device. The devices, systems and methods disclosed herein implements persistent storage of parameters while avoiding the interruption of transceiver digital diagnostics communications and internal controls. In at least one example, digital diagnostic parameters are stored that relate to one or more multi-source agreement (MSA) or a customer-unique digital diagnostics map. These digital diagnostic parameters may also relate to a number of factors, such as conditions that may affect the operation of the transceiver. These digital diagnostic parameters may be determined by analyzing signals received from various sensors or other sources, including analog component sources and sensors. Regardless of how they are obtained, a control module always stores all digital diagnostics parameters, persistent across power sessions or not, to system memory, such as a RAM buffer, on the transceiver. Once in system memory, the host and/or other control logic may readily access these parameters without delay. An updater compares a subset of the RAM digital diagnostics parameters that are required to persist across power sessions, to a mirror copy of the digital diagnostics parameters stored in persistent memory. The updater than writes the appropriate updates to the persistent memory. Such a configuration may reduce stalls associated with direct access to the digital diagnostic parameters on the persistent memory to thereby allow digital diagnostics parameters and other information to be readily written to and read from the transceiver.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method of managing storage of digital diagnostics parameters on a transceiver device having system memory and persistent memory residing thereon, the method including:
    loading persistent digital diagnostics parameters from the persistent memory into the system memory and resetting non-persistent digital diagnostics parameters;
    receiving updates to the non-persistent digital diagnostics parameters in the system memory; and
    writing the updates to the non-persistent digital diagnostic parameters in the system memory to the persistent memory.

2. The method of claim 1, further comprising directing read and write of the digital diagnostics parameters by a host from the persistent memory to the system memory.

3. The method of claim 1, further comprising directing read and write of the digital diagnostics parameters by other control logic from the persistent memory to the system memory.

4. A method of managing storage of digital diagnostics parameters on an optical transceiver module having system memory and persistent memory residing thereon, the method including:
    loading digital diagnostic parameters from the persistent memory into the system memory;
    receiving updates to the digital diagnostics parameters in the system memory; and
    comparing each digital diagnostic parameter in the system memory to the corresponding digital diagnostic parameter in the persistent memory; and
    upon detection of a mismatch, writing the digital diagnostic parameter in the system memory to the corresponding digital diagnostic parameter in the persistent memory.

5. The method of claim 4, wherein the digital diagnostic parameters in the system memory are non-persistent digital diagnostic parameters.

6. The method of claim 5, further comprising:
    assigning non-persistent digital diagnostics parameters in the system memory initial values.

7. The method of claim 4, wherein the digital diagnostic parameters include transmitter bias current, transmitter optical power, receiver optical power, transceiver supply voltage, transceiver temperature, or some combination thereof.

8. The method of claim 4, wherein receiving updates to the digital diagnostics parameters in the system memory comprises receiving updates to the digital diagnostics parameters in the system memory from an external transceiver host computing system that is in communication with the optical transceiver module.

9. The method of claim 8, wherein the optical transceiver module receives updates to the digital diagnostics parameters in the system memory from the external transceiver host computing system using an I$^2$C interface protocol.

10. The method of claim 4, wherein optical transceiver module is substantially compliant with one of the Small Form Factor Pluggable Module Multi-Source Agreement (XF MSA), Small Form-Factor Pluggable Module Multi-Source Agreement (SFP MSA), or the Small Form-Factor Module Multi-Source Agreement (SFF MSA).

11. The method of claim 10, wherein the persistent memory comprises EEPROM (Electrically Erasable and Programmable Read Only Memory).

12. The method of claim 11, wherein the system memory comprises (Random Access Memory).

13. The method of claim 4, wherein loading digital diagnostic parameters from the persistent memory into the system memory includes resetting non-persistent digital diagnostics parameters in the system memory.

14. An optical transceiver module comprising:
    an optical transmitter;
    an optical receiver; and
    a system memory and a persistent memory both configured to store digital diagnostic parameters related to the function of the optical transmitter and the optical receiver, wherein the optical transceiver module is configured to:

load digital diagnostic parameters from the persistent memory into the system memory and reset non-persistent digital diagnostics parameters in the system memory;

receive updates to the digital diagnostics parameters in the system memory from an external transceiver host computing system that is in communication with the optical transceiver module; and write the updates to the digital diagnostic parameters in the system memory to the persistent memory.

15. The optical transceiver module of claim 14, wherein the digital diagnostic parameters include transmitter bias current, transmitter optical power, receiver optical power, transceiver supply voltage, transceiver temperature, or some combination thereof.

16. The optical transceiver module of claim 14, wherein the optical transceiver module is configured to received updates to the digital diagnostics parameters in the system memory from the external transceiver host computing system using an I²C interface protocol.

17. The optical transceiver module of claim 14, wherein optical transceiver module is substantially compliant with one of the Small Form Factor Pluggable Module Multi-Source Agreement (XF MSA), Small Form-Factor Pluggable Module Multi-Source Agreement (SFP MSA), or the Small Form-Factor Module Multi-Source Agreement (SFF MSA).

18. The optical transceiver module of claim 14, wherein the persistent memory comprises EEPROM (Electrically Erasable and Programmable Read Only Memory) and the system memory comprises RAM (Random Access Memory).

19. The optical transceiver module of claim 14, wherein the optical transceiver module is configured to write the updates to the digital diagnostic parameters in the system memory to the persistent memory by:

comparing each digital diagnostic parameter in the system memory to the corresponding digital diagnostic parameter persistent memory; and upon detection of a mismatch, writing the digital diagnostic parameter in the system memory to the corresponding digital diagnostic parameter persistent memory.

* * * * *